United States Patent
McWilliam et al.

(10) Patent No.: US 6,839,453 B1
(45) Date of Patent: Jan. 4, 2005

(54) METHOD AND APPARATUS FOR AUTHENTICATING UNIQUE ITEMS SUCH AS SPORTS MEMORABILIA

(75) Inventors: Richard P. McWilliam, Cardiff, CA (US); G. Lynn Hagen, Flagstaff, AZ (US); Robert G. Andrews, San Diego, CA (US); Matthew Hoerr, Poway, CA (US); Adam Christianson, San Diego, CA (US); Brenton Demko, San Diego, CA (US); William B. Abrahams, San Diego, CA (US); Richard Sutherland, San Diego, CA (US)

(73) Assignee: The Upper Deck Company, LLC, Carlsbad, CA (US)

( * ) Notice: Subject to any disclaimer, the term of this patent is extended or adjusted under 35 U.S.C. 154(b) by 0 days.

(21) Appl. No.: 09/572,755

(22) Filed: May 16, 2000

(51) Int. Cl.[7] .............................. G06K 9/00; G06K 9/22
(52) U.S. Cl. ...................... 382/119; 382/116; 382/124; 382/313; 382/314; 340/5.82; 283/70; 283/74; 283/75; 705/26; 705/27; 705/37
(58) Field of Search ................................. 340/5.8, 5.81, 340/5.82, 5.83, 5.84, 5.85, 5.86; 382/115, 116, 117, 118, 119, 120, 121, 122, 123, 124, 125, 126, 127; 705/26, 27, 37; 283/68, 69, 70, 74, 75, 77, 78, 85, 86, 113

(56) References Cited

U.S. PATENT DOCUMENTS

| | | | |
|---|---|---|---|
| 3,955,178 A | | 5/1976 | Warfel |
| 4,757,549 A | * | 7/1988 | Machart et al. ............. 382/119 |
| 4,963,859 A | | 10/1990 | Parks |
| 5,103,486 A | * | 4/1992 | Grippi ........................ 382/116 |
| 5,226,091 A | | 7/1993 | Howell et al. |
| 5,267,756 A | | 12/1993 | Molee et al. |
| 5,306,049 A | | 4/1994 | Schireck |
| 5,380,047 A | | 1/1995 | Molee et al. |
| 5,401,561 A | | 3/1995 | Fisun et al. |
| 5,422,959 A | | 6/1995 | Lee |
| 5,499,294 A | | 3/1996 | Friedman |

(List continued on next page.)

FOREIGN PATENT DOCUMENTS

| | | |
|---|---|---|
| EP | 0926621 | 6/1999 |
| JP | WO 0013141 | 3/2000 |
| WO | WO 9936879 | 7/1999 |
| WO | WO 9939302 | 8/1999 |
| WO | WO 9957678 | 11/1999 |
| WO | WO 9960467 | 11/1999 |
| WO | WO 9960468 | 11/1999 |
| WO | WO 9960469 | 11/1999 |
| WO | WO 9960515 | 11/1999 |
| WO | WO 9960516 | 11/1999 |

OTHER PUBLICATIONS http://www.anoto.com/sites/tech_white.asp, "The Anoto White Paper", Apr. 24, 2000, pp. 1–5.
http://www.anoto.com/sites/tech_desc.asp, "Anoto Technology", Apr. 24, 2000, pp. 1–2.

(List continued on next page.)

Primary Examiner—Jingge Wu
Assistant Examiner—Ryan J. Hesseltine
(74) Attorney, Agent, or Firm—Pillsbury Winthrop LLP

(57) ABSTRACT

A method and system for providing owners, potential buyers and other users of autographed items such as sports and other entertainment memorabilia visual evidence for verifying the authenticity of the autograph are described. A method of the present invention involves capturing an image of the signature as it is being placed on the item. The image so captured is then stored on a computer readable medium. In addition to the item itself, the owner of the item may be provided with a computer readable medium containing computer readable instructions for accessing the image and other information about the item, the signing process, the autographer, etc. The image may be captured by a camera mounted on a pen or other writing instrument.

49 Claims, 4 Drawing Sheets

U.S. PATENT DOCUMENTS

| | | | |
|---|---|---|---|
| 5,544,255 A | | 8/1996 | Smithies et al. |
| 5,559,895 A | | 9/1996 | Lee et al. |
| 5,561,282 A | * | 10/1996 | Price et al. .................. 235/380 |
| 5,737,886 A | | 4/1998 | Kruckemeyer |
| 5,745,177 A | | 4/1998 | Lamoure |
| 5,774,602 A | * | 6/1998 | Taguchi et al. ............. 382/314 |
| 5,781,661 A | | 7/1998 | Hiraiwa et al. |
| 5,803,501 A | | 9/1998 | Gluck |
| 5,845,265 A | * | 12/1998 | Woolston ..................... 705/37 |
| 5,872,848 A | | 2/1999 | Romney et al. |
| 5,940,811 A | | 8/1999 | Norris |
| 5,971,435 A | | 10/1999 | DiCesare et al. |
| 6,082,774 A | * | 7/2000 | Schlauch ..................... 283/67 |
| 6,108,639 A | * | 8/2000 | Walker et al. ................. 705/26 |
| 6,150,921 A | * | 11/2000 | Werb et al. ................. 340/10.1 |
| 6,150,948 A | * | 11/2000 | Watkins ................... 340/693.3 |
| 6,195,646 B1 | * | 2/2001 | Grosh et al. .................. 705/26 |
| 6,307,956 B1 | * | 10/2001 | Black ......................... 382/124 |
| 6,396,481 B1 | * | 5/2002 | Challa et al. ............... 345/169 |
| 6,405,177 B1 | * | 6/2002 | DiMattina .................... 705/26 |
| 6,433,818 B1 | * | 8/2002 | Steinberg et al. ........... 348/161 |
| 6,591,252 B1 | * | 7/2003 | Young ......................... 705/67 |
| 6,631,200 B1 | * | 10/2003 | Savoray et al. ............. 382/119 |
| 6,681,045 B1 | * | 1/2004 | Lapstun et al. ............. 382/187 |
| 6,707,942 B1 | * | 3/2004 | Cortopassi et al. ......... 382/186 |
| 2001/0010330 A1 | | 8/2001 | DeFabio, Jr. |

OTHER PUBLICATIONS http://www.anoto.com/sites/tech_pen.asp, "From Your Fingertips to Computer Chips (Your Hand Writes Everywhere)", Apr. 24, 2000, pp. 1–2.

http://www.anoto.com/sites/tech_pattern.asp, "A Pattern and Paper That Will Change the World (You Scribble Can Travel", Apr. 24, 2000, pp. 1–2.

http://ww.anoto.com/sites/tech_work.asp, "Anoto and You (How the System Works)", Apr. 24, 2000, pp. 102.

http://www.research.ibm.com/resources/magazine/1997/issue_3/paper397.html, IBM Research Magazine, "Putting Pen to Smart Paper", w. David Gardner, Apr. 26, 2000, pp. 1–4.

* cited by examiner

| ABC12345 | — 301 |
| Joe Dimaggio | — 302 |
| Baseball | — 303 |
| Bat | — 304 |
| 8:00 AM | — 305 |
| 1/1/2000 | |
| New York Yankees | — 306 |
| A00E0012 | — 307 |

FIGURE 4

METHOD AND APPARATUS FOR AUTHENTICATING UNIQUE ITEMS SUCH AS SPORTS MEMORABILIA

BACKGROUND

There are established methods and systems for certifying the authenticity of autographed sports memorabilia. Such methods are described in U.S. Pat. Nos. 5,267,756 and 5,380,047 (Molee et al.). The systems described in these patents require a sticker or label attached to the autographed article using a tamper-proof adhesive. The sticker or label bears a holographic image and a unique code number. A certificate of authenticity is issued with the autographed article which bears a like or different hologram with the same unique code number. The certificate of authenticity is signed by a witness to the signing event. A registration entity maintains a master list of the autographed articles and their associated code numbers. The registration entity also operates a "hotline" whereby purchasers can register articles authenticated in this manner or potential buyers can verify authenticity.

U.S. Pat. No. 5,306,049 (Schireck) describes a system for authenticating sports memorabilia in which the autographer's fingerprint is affixed to the autographed article and an authentication certificate. Alternatively, U.S. Pat. No. 5,737,886 (Kruckemeyer) discloses a system in which an electronic fingerprint, such as a diffraction grating pattern, personal to the autographer and the item to be signed is affixed to the item near the signature. The electronic fingerprint is mechanically or optically read so that the item can be registered. A certificate of authenticity is issued.

Finally, U.S. Pat. No. 5,971,435 (DiCesare et al.) describes a system for verifying the authenticity of an autograph in which an signing event is witnessed. An identifying code number is affixed to the autographed item. A voucher with details of the autographing event contains the same identifying code number. A certificate of authenticity is issued which bears a different code number than the item and the voucher. A database contains the code numbers affixed to the item and the certificate of authenticity. Subsequent transfers of ownership may be recorded.

SUMMARY

An embodiment of the present invention is generally directed to a method of authenticating unique autographed items, such as sports memorabilia items, trading cards of all shapes, sizes, formats, mediums and compositions (including gold, porcelain, metal, digital and commemorative trading cards), photographs, motivational prints, standees, lithographs, mini-jersey replicas, plaques, plates, trophies, autographed sports apparel, autographed sports equipment, magazine covers, pins, medallions, cels, figurines, steins, tankards, coins, signed art works, signed book editions, and musical and cinematic memorabilia (e.g., album covers, t-shirts, posters, etc.). The term "item" as used hereinafter encompasses all of the aforementioned types of memorabilia and collectibles. In this embodiment of the invention, owners and potential buyers of autographed items are provided with visual proof of the signing event. The method involves capturing a video or photographic image of the signing event, storing the image on a computer readable medium along with information related to the signing event, and allowing the owner of the signed memorabilia or others access to the image and/or information. The image may be captured in an analog or a digital format.

In an embodiment of the invention, the owner may receive a computer readable medium (along with the memorabilia item) containing computer readable instructions for accessing the image and/or information. The computer readable instructions given to the owner may also be usable to create other computer readable instructions that can be transferred to a potential buyer, allowing the potential buyer to access the image and/or information or a limited portion thereof.

Another embodiment of the invention is directed to an apparatus for capturing the image of the signing event. The apparatus includes a camera mounted on the writing instrument used by the autographer. The apparatus may further include image stabilization/centering, image triggering, or signer identification elements.

BRIEF DESCRIPTION OF THE DRAWINGS

FIG. 4 illustrates a sample database record which may be used in an embodiment of the present invention.

DETAILED DESCRIPTION

Embodiments of the present invention relate to systems and methods for authenticating unique, autographed memorabilia items by allowing memorabilia owners and potential buyers to have access to image(s) of the signing event and signing-related information. A potential buyer is any individual or entity other than the memorabilia item owner. Embodiments of the invention are also directed to computer readable instruction for allowing the owner of a memorabilia item or a potential buyer to access signing event images or signing-related information. Furthermore, embodiments of the invention are directed to a pen-mounted camera that may be used to capture images of the signing event.

Figure 1:
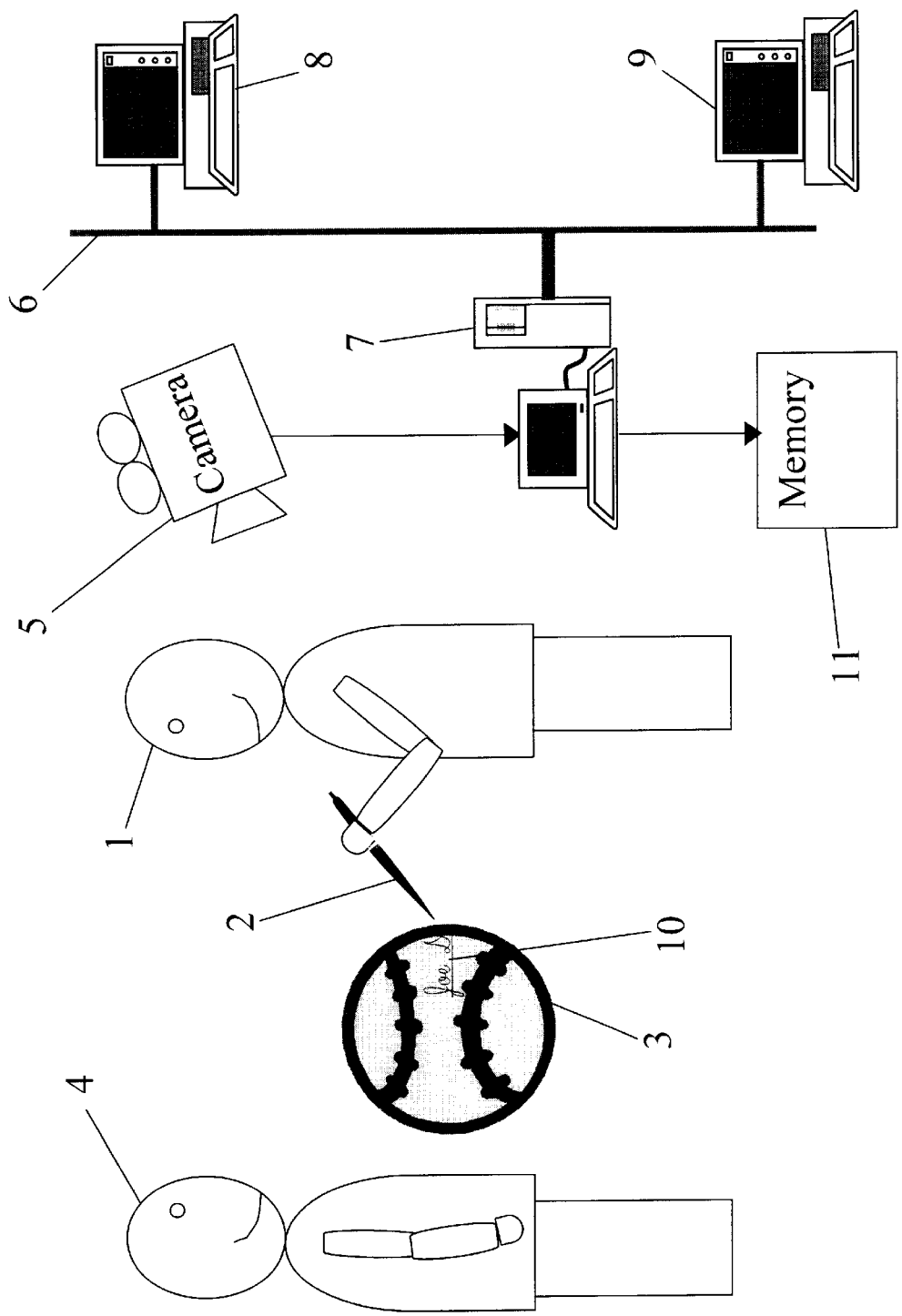
FIG. 1 depicts the major elements of an embodiment of the system and method for authenticating unique, autographed memorabilia items according to the present invention.

FIG. 1 depicts an embodiment of the invention in which an authenticating representative 4 observes the autographer 1 signing memorabilia item 3 using a writing instrument 2, such as an ink pen or marker. The memorabilia item 3 may be initially unsigned or may already be marked with the signatures of other autographers. The authenticating representative 4 may verify the identity of autographer 1 prior to his/her signing of the signature 10 on memorabilia item 3. As autographer 1 signs the memorabilia item 3, a camera 5 captures a photographic or video image of the signing event. The term "image" as used herein includes, without limitation, single still images, sequences of multiple images, video recordings and portions thereof. The term "camera" means any image capturing device including, without limitation, a video camera, still camera, digital camera, charge-coupled device (CCD) camera, infrared camera or sensing array, etc. The image may focus on the item being signed or on the autographer, among other targets, the process of capturing an image may include preparing the image for storage on a computer readable medium by, for example, cropping a snapshot-type image to center around a particular target, editing a video clip to include only a portion of the frames taken by the camera, or digitally editing the image to improve picture quality. For an image composed of multiple frames, the frame rate of image capture may differ from the frame rate at which the image or a portion thereof is replayed. For example, the frame rate of replay may be slower that the frame rate of capture.

The image (or a portion thereof) may be stored on an appropriate medium. For example, a physical image of the signing event may be captured using a conventional camera and then stored on photographic film or a video cassette. In an alternative embodiment of the invention, an electronic image of the signing event may be captured using a digital camera and may be stored on a SmartMedia card, ClikStick, floppy disk, compact disk (CD), digital video disk (DVD), hard drive or other computer readable medium. The present invention does not require that the electronic image be stored on a medium separate from a central server. In an embodiment of the present invention, the image may be transmitted in real-time to the central server and stored therein.

In an embodiment in which the camera 5 captures an electronic image of the signing event, the image may be transmitted to the central server 7 using either wireless or wire-based communication channels. Examples of wire-based transmission include coaxial cable, twisted-pair telephone wire, electric power line, fiber optics, leased lines, and the like. Examples of wireless transmission include cellular, satellite, radio frequency, microwave, and like communication systems. In an embodiment in which the camera 5 captures a physical image of the signing event, the physical image may be converted to an electronic image using a document imaging device such as a scanner (not shown) and then transmitted to server 7. The central server 7 may then store the electronic image in memory 11.

Electronic images may be stored in memory 11 in the form of database records or electronic files. Database records or electronic files containing electronic images may also contain signing-related information (e.g., the date and location of the signing event; a record of ownership; a certificate of authenticity; the name or team affiliation of the autographer; video, audio, text, photographic and virtual reality data related to an action, activity, sport, highlight, performance statistic or news related to the autographer; the type, manufacturer/brand and age of the memorabilia item; a unique item identifier; and information related to the encryption, protection or access of images and signing-related information by the owner or a potential buyer). In an embodiment of the invention, a unique item identifier consisting of a radio frequency identification (RFID) tag may be affixed to the item 3. The RFID tag may be active (i.e., powered by an internal power source) or passive (i.e., powered by signals received from a transceiver unit). The RFID tag may be read as the item 3 comes within a specified distance from the camera 5 or writing instrument 2 and the identifying code read from the tag may be stored with the captured image. The RFID tag may be encoded with a unique identifying code associated with the memorabilia item 3. The RFID tag may also be encoded with information identifying the autographer 1 before, during or after the item is signed by the autographer. In an embodiment of the invention, the RFID tag may be a write-once, read many (WORM) type of tag in which, as the name suggest, information may only be written to the tag once but may be read from the tag multiple times.

Other unique item identifiers may include a bar code or diffraction grating pattern affixed to the item 3. Database records or electronic files may also be categorized according to signing-related information, as described in more detail below with respect to FIG. 4. The database records need not be categorized according to information contained in the database records.

In an embodiment of the invention, the signing-related information may include a certificate of authenticity (not shown). The memorabilia item 3 may be marked with a unique identifier, such as an alphanumeric code, which is also imprinted on the certificate of authenticity. The certificate may be signed by the authenticating representative 4 and/or the autographer 1 during or after the signing event. The certificate of authenticity need not be a physical document. In an embodiment of the invention, the certificate of authenticity is an electronic document and the authenticating representative 4 digitally signs (i.e., causes unique identifying electronic information to be attached to a document file) the certificate of authenticity. In an alternative embodiment, a physical certificate of authenticity is created and an electronic copy of the certificate of authenticity is created using a document imaging device, such as a scanner. In an embodiment in which the certificate and image are electronic, the two may be stored as part of a single database record or image file or they may be stored as separate files indexed to the same memorabilia item-related information.

In another embodiment of the present invention, memorabilia item ownership information, i.e. a record of ownership, may be stored and indexed along with the image. The record of ownership may include, for example: information related to the present owner of the memorabilia item; provenance, or ownership origin, information about the memorabilia item; information on past owners of the memorabilia item; prices paid for the memorabilia item in various transactions; information related to offers made to sell or buy the memorabilia item or for-sale status of the memorabilia item; and reports on the condition of the memorabilia item. Information related to past and present owners of the memorabilia item may include the owner's name, telephone number, address, electronic mail address and other contact information, age, gender or information on other items owned by the owner.

In an embodiment of the invention, central server 7 is connected to a network of computers 8 and 9 through network connection 6. Network connection 6 may be any type of public or private communication network, including a local area network, a wide area network, a metropolitan area network, Ethernet, private network (e.g., VPN), an intranet or the Internet. The owner of the memorabilia item 3 may access the electronic image of the signing event for memorabilia item 3 and other information related to the memorabilia item 3, such as a certificate of authenticity or record of ownership, by connecting to the network connection 6 through owner computer 8. The central server 7 may require the owner to enter identifying information before allowing the purchaser to access the electronic image and associated memorabilia-item related information. Alternatively, when purchaser buys memorabilia item 3, he/she may also receive a computer readable medium, such as a compact disk, floppy disk, digital video disk (DVD), SmartMedia card, ClikStick, or an object bearing a magnetic strip or embedded memory chip, containing identifying information unique to the memorabilia item. The computer readable medium may also contain computer readable instructions that, when executed, perform the functions necessary to provide the owner access to the images and associated memorabilia item-related information. In an embodiment incorporating a "hotlink" feature, for example, the computer readable medium may contain instructions to display on the owner computer 8 an icon, button or hyperlink that is activated if the owner clicks a mouse button when the mouse pointer is positioned on the hyperlink or screen icon. The icon, button or hyperlink may be contained in a browser-based file (e.g., in an HTML or XML format), e-mail file (e.g., in a MIME format) or embedded form (e.g., automatically activated when an object bearing a magnetic strip is swiped). By activating the hyperlink or screen icon, the owner causes owner computer 8 to execute further computer readable instructions that connect owner computer 8 to a website, which may be identified by a unique Uniform Resource Locator (URL), hosted by central server 7 through network connection 6. From the website, the owner may access the images and memorabilia item-related information. The hotlink feature may also retain a unique owner identification code and/or password associated with the owner and submit the owner identification code and/or password to the central server 7 when activated to obtain access to the images or associated memorabilia item-related information for the owner.

In another embodiment of the invention, a potential buyer of the memorabilia item 3 or other interested party may also access this image and information or a portion or variant thereof by connecting to the central server 7 through the network connection 6 using potential buyer computer 9. Owner computer 8 and potential buyer computer 9 may be of the same general type, and may even be the same physical device. Limitations on potential buyer access may include, for example, denial of access to past transaction price information in the ownership record or provision of access to only an altered version of the original signing event image. The potential buyer may be required to submit a password provided by the owner in order to be given access to the image and information. Moreover, the owner may be allowed to specify to which images and information a potential buyer should be given access. In a particular embodiment of the invention, the owner may create a limited-access hotlink for a potential buyer to use in accessing the images and memorabilia item-related information associated with the owner's memorabilia item. The potential buyer hotlink may retain potential buyer identifying information such as a identification code, user name or password and may be usable for a limited duration specified by the owner. In another embodiment of the invention, information related to the creation of potential buyer hotlinks is included in the stored signing-related information. A hotlink may be embedded in a stand-alone application, including interactive applications like Macromedia Director Projector, or a Shockwave file, either of which may also contain information related to the autographer.

Hotlinks may incorporate encryption techniques such as shared private key encryption, public/private key encryption or Kerberos encryption. In a shared private key encryption embodiment, both communicating nodes, e.g., the central server 7 and the owner computer 8, typically use the same encryption method in their communications. In a public/private key embodiment, data is typically encrypted using a public key at the sending node and decrypted using a private key related to the public key at the receiving node. Public and private key pairs may be chosen using an algorithm, such as PGP, RSA Laboratories RC algorithms, MARS, Rijndael, Serpent and Twofish, and may be uniquely created for each session between nodes. In a Kerberos encryption embodiment, the nodes use a shared private key to create a session-specific private key to be used in communicating data. In an embodiment of the invention, the owner hotlink may be usable to create a potential buyer hotlink. In such an embodiment, an encryption key associated with the potential buyer hotlink may be related to the encryption key associated with the owner hotlink.

Other signing-related information related to an owner's or potential buyer's access to signing event images or signing-related information may include exhibition packages, i.e., a set of images and/or signing-related information that may be distributed to potential buyers. In an electronic or conventional auction context, the exhibition package may include an auction alias, i.e. a potential buyer hotlink or other limited-access hotlink.

FIG. 1 depicts an embodiment of the present invention in which the camera 5 as being positioned behind the autographer 1 so that the camera captures an image of signature 10 over the shoulder of the autographer 1. Other embodiments of the invention may incorporate two cameras, a first camera 5 to capture the image of the signature 10 during the signing event and a second camera (not shown) to capture an image of the autographer 1 during the signing event. In such an embodiment, the images may be captured simultaneously. In this way, the identity of the autographer 1 can be verified. In such an embodiment, the second camera may be placed facing the autographer 1.

In an alternative embodiment, a first camera may be used to capture an image of the signature 10 during the signing event and other identifying means may be used to verify the identity of the autographer 1. Such identifying means may include special writing instruments which operate only after the autographer 1 has submitted, and a processor has verified, an identifying password or a biometric reading, such as a fingerprint, DNA sample, retinal scan, or facial image submitted by the autographer. Alternatively, the identifying means may be computer readable instructions for comparing the image of the signature taken during the signing event with a stored image of a signature known to have been made by the intended autographer. The signature images may be compared based on the time taken to complete various portions of the signature or the shape of signature features among other things.

Figure 2:
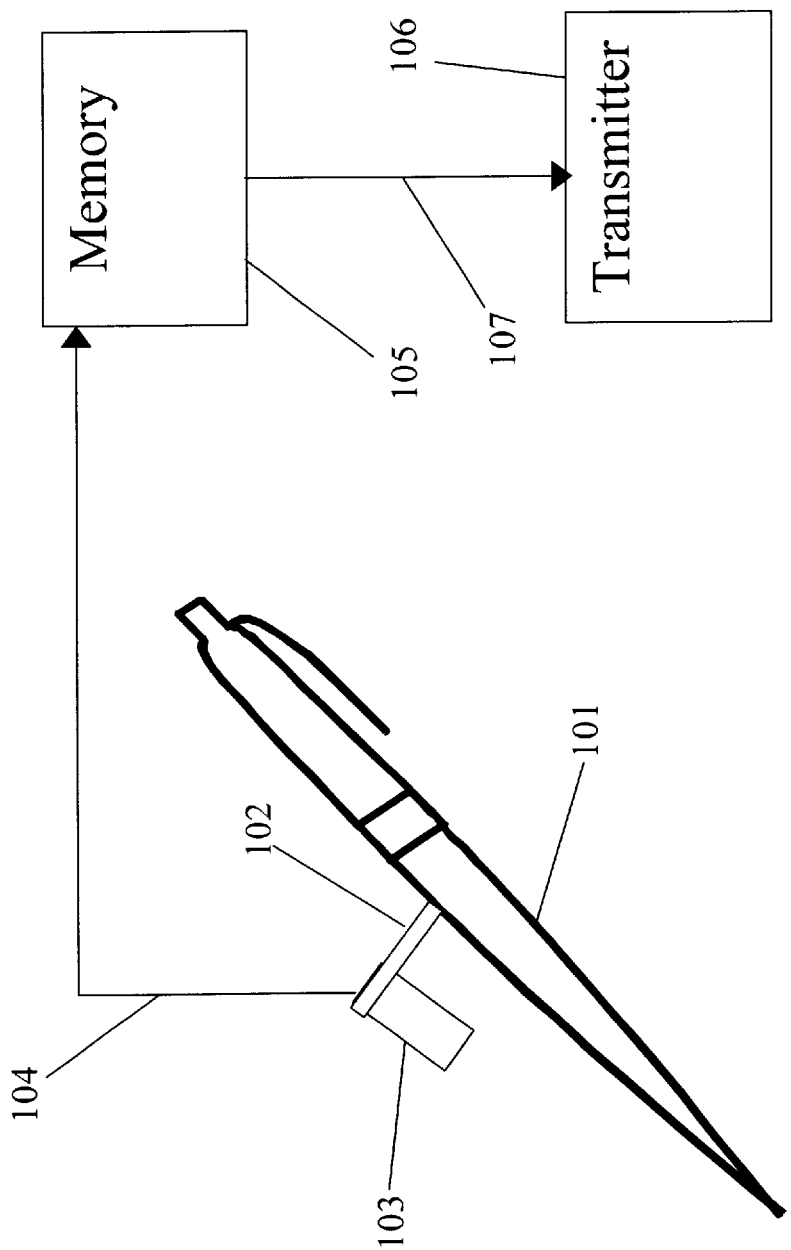
FIG. 2 illustrates an embodiment of the pen-mounted camera apparatus according to the present invention.
Figure 3:
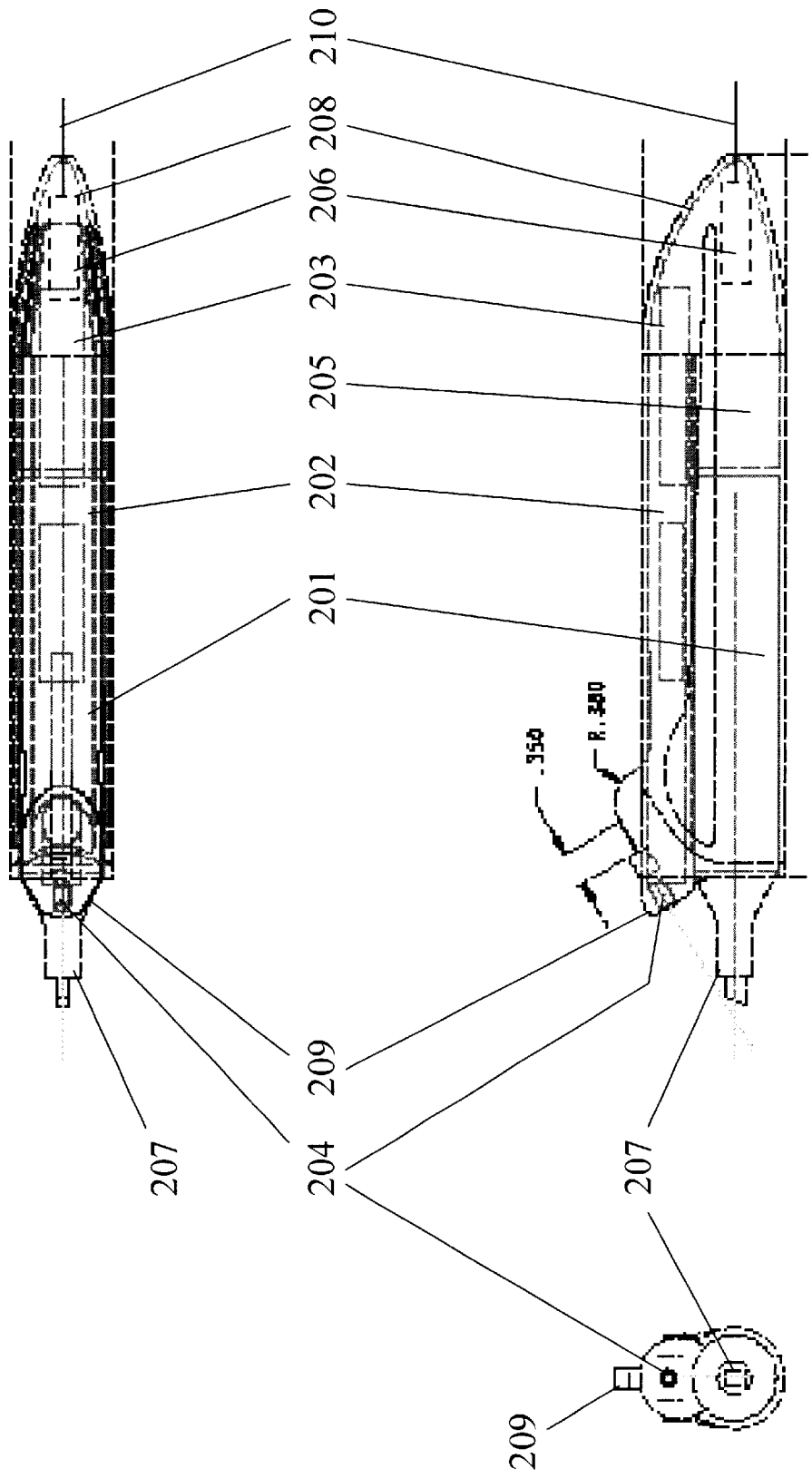
FIG. 3A is a front view of another embodiment of the pen-mounted camera according to the present invention.
FIG. 3B is a right side view of another embodiment of the pen-mounted camera according to the present invention.
FIG. 3C is a top plan view of another embodiment of the pen-mounted camera apparatus according to the present invention.

Moreover, even though FIG. 1 illustrates an embodiment in which a standard camera is positioned behind the autographer 1, other embodiments of the present invention may use a pen-, helmet-, or wrist-mounted camera. Embodiments of a pen-mounted camera are illustrated in FIG. 2 and FIG. 3. In FIG. 2, writing instrument 101 corresponds to writing instrument 2 in FIG. 1. A coupling 102 may be attached to writing instrument 101 on one end and a camera 103 on the other end. The pen-mounted camera 103 in FIG. 2 may take the place of, or be used in conjunction with, the camera 5 in FIG. 1. The camera 103 may be a charge-coupled device (CCD) camera such as the Panasonic model number GP-CX261 camera. The camera 103 may be angled relative to the body of the writing instrument 101 so that the image captured by the camera 103 is centered on the signature or another selected target. The coupling 102 may be flexible to allow the camera 103 to be positioned. Moreover, the present invention need not use coupling 102 to attach camera 103 to writing instrument 101; an adhesive, removable clip, pins or other fastening devices may be used to attach the camera 103 to the writing instrument 101. In another embodiment of the invention, the camera 103 may be integrally incorporated into the body of the writing instrument 101. In an embodiment of the invention, the position (including the orientation) of the camera 103 relative to the writing instrument 101 may be changed, for example, to include a selected target object (e.g., the signature) within the captured image. Alternatively, the camera 103 may be fixed in a particular position in relation to the body of the writing instrument 101. For example, the camera 103 may be fixedly oriented so as to capture an image of the tip of the writing instrument 101. This may be accomplished by attaching the camera 103 to the writing instrument 101 using a coupling 102 that is flexible. Alternatively, the coupling 102 may include a rotatable joint (not shown) at one or both of its ends.

The image-capturing function of the camera 103 may begin when the camera 103 receives a physical or electronic trigger signal from a triggering signal generator (not shown). Examples of physical trigger signals include signals generated by pushing a power or start button on the camera, removing a cap on the writing instrument or lifting of the writing instrument. An example of an electronic trigger signal is a pulse or edge trigger signal generated by a computer communicating with the camera 103 and transmitted to the camera 103 using either wireless or wire line systems. The camera 103 may receive a second trigger signal to end image capturing.

In an embodiment of the invention in which camera 103 captures electronic images, connection 104 connects camera 103 to a computer readable memory 105 and images captured by camera 103 may be sent to memory 105 for storage. Images stored in memory 105 may then be selectively sent to transmitter 106 via connection 107 for transmission to a processor (not shown), such as the central server 7 shown in FIG. 1. An alternative embodiment of the invention in which all images captured by the camera 103 are transmitted by transmitter 106 to the processor does not require a memory 105 to be connected to connection 104. In such an embodiment, connection 104 may connect camera 103 with transmitter 106. In either type of embodiment, connections 104 and 107 may be wire connections (such as coaxial cables, twisted-pair telephone wires, fiber optics, electrical power lines, leased lines) or wireless connections (such as cellular, satellite, radio frequency, microwave, or like communication systems).

FIG. 3 illustrates another embodiment of a pen-mounted camera. The writing instrument 201 has a body 202. Also contained within the body 202 are the camera 203, lens 204, power source 205, and transmitter 206. The camera 203 may be a charge-coupled device (CCD) camera of the type of Panasonic model number GP-CX261 camera. In this particular embodiment of the invention, the transmitter 206 is wireless and may send signals using radio frequency, IR, microwave or any other frequency transmission via antenna 210. The transmitter may be of the type of VTX model number MV915. It may send signals to a receiver (not shown) of the type of MVRX402 model. The transmitter 206 may initiate or terminate transmission upon receiving a triggering signal from either the camera 203 (e.g., a signal generated by the camera once the image or a portion thereof has been captured) or an outside source (e.g., a signal from a computer indicating that it is ready to receive data related to the captured image). In these embodiments, the camera or outside source acts as a triggering signal generator. Alternatively, transmission may be initiated and/or terminated periodically or upon the actuation of a button, switch, circuit loop or other electromechanical device that produces an electrical signal and is electrically associated with the transmitter 206. Similarly, the camera 203 may initiate and/or terminate image capture upon the receipt of a triggering signal such as a signal received from the transmitter 206, the actuation of an electromechanical device that produces an electronic signal and is electrically associated with the camera, the reading of a unique item identifier or the sensing of the proximity of the item. Alternatively, the pen-mounted camera may include a radio frequency, infrared, microwave or the like receiver (not shown) by which input signals from a source other than a component of the pen-mounted camera may be received which may cause the receiver to generate a triggering signal. In an embodiment in which a radio frequency (RF) identification tag is affixed to the item, the RF identification tag may be set to be readable for a predetermined range and may be polled periodically to determine when the item is within the predetermined range of the pen or autographer (based upon whether the tag sends a response to the polling signal). In such an embodiment, the triggering signal may be the receipt or loss of the tag's response signal. Alternatively, image capture may be initiated and/or terminated periodically. In an alternative embodiment of the present invention, the pen-mounted camera apparatus may include a sensor (not shown) that determines when the tip 207 is in contact with the item being signed and image capture may be initiated and/or terminated upon receipt of a signal by the camera 203 from this sensor. The electromechanical devices, transmitter and sensors discussed with respect to these embodiments act as triggering signal generators for image capture. The camera, transmitter and other electrical components of the pen-mounted camera apparatus may be powered by a power source 205 such as a battery. The body 202 may have an aperture through which the lens 204 transmits light to be captured by the camera in the form of the image. In an embodiment of the invention, the lens 204 may be smaller than the aperture. In an alternative embodiment, the lens 204 may be integrated with the body so that the no aperture exists or the aperture may be covered with a clear medium. The lens 204 may be concave, convex or flat in shape and may be polarized or specially coated to reduce glare or lens transmissivity.

The body 202 may be designed so as to accommodate the camera 203, transmitter 206 and power source 205 in a channel in the body's interior. The body may include a detachable front cap 209 and/or end cap 208. The writing instrument 201 may be contained in the same channel in the body 202 or a separate channel, with the tip 207 of the writing instrument 201 protruding from the body 202. The entire writing instrument may be removably attached to the pen-mounted camera apparatus. Alternatively, the tip 207 of the writing instrument 201 may be interchangeable with other tips. The external shape of the body 202 may be designed to conform to the shape of a human hand. In an embodiment of the invention, the external shape of the body 202 may be designed to conform to a particular athlete's hand.

In another embodiment of the invention, the camera in the pen-mounted camera apparatus may be a CMOS imager. In such a system the camera would both capture an image and digitally process the image. The CMOS imager camera may include a single computer chip which contains both a photo-detector array and digital image processing circuitry. An example of such a chip is the CMOS Imaging Sensor chip manufactured by Mitsubishi.

FIG. 4 depicts a sample database record that may be used as a format for storage of the captured image and signing-related information. Element 301 may contain a unique memorabilia item identification code, such as an alphanumeric code. For example, in FIG. 4, the information in element 301 identifies the item by the alphanumeric code "ABC12345". The alphanumeric code may correspond to the information contained in a unique item identifier that may be affixed to the memorabilia item 3. Element 302 may contain information about the autographer, such as the autographer's name. For example, in FIG. 4, the information contained in element 302 indicates that the autographer was "Joe Dimaggio". Element 303 may identify the field of endeavor with which the item 3 or autographer 1 is associated. The field of endeavor may be a particular sport, e.g., "Baseball", "Basketball", "Football", "Hockey", "Soccer", "Tennis" or other sports. In FIG. 4, the information contained in element 303 indicates that the memorabilia item is related to the sport of "Baseball". In other embodiments of the invention, the memorabilia item or the autographer may not be related to sports. For example, the item may be an autographed musician's guitar. In such an embodiment, element 303 may identify the item as being related to "Music" or to a specific musical genre, e.g., "Rock-and-roll", "Jazz", "Blues", etc. Element 304 may contain information about the type of memorabilia item, e.g., a "ball", "bat", "glove" or "uniform". In FIG. 4, for example, the information contained in element 304 indicates that the memorabilia item is a "Bat". Element 305 may contain information about the date and time of the signing event. For example, in FIG. 4, the information in element 305 indicates that the item was signed at 8:00 AM on Jan. 1, 2000. In an alternative embodiment, the year of the signing may be stored in a separate element from other date/time information. Element 306 may contain information about the group affiliation of the autographer. For example, in FIG. 4, the information contained element 306 indicates that the autographer was affiliated with the "New York Yankees". If the item was a musical instrument or the autographer was a musician, the element may contain the name of the musical group for which the musician plays. Element 307 may contain a pointer to a memory location containing the captured image. For example, in FIG. 4, the hexadecimal number "A00E0012" may be associated with the location in memory at which the image file began. In an alternative embodiment, element 307 may contain the name of the file in which the captured image is stored. The sample database record is only an example of the type of database record that may be maintained to store captured images and signing-related information. Alternative records may contain more, less or different information, may categorize the information in different elements, or may relate the elements in a different order. Moreover, in other embodiments of the invention, the signing-related information and captured images may be stored in a form that does not use database records. For example, signing-related information and captured images may be stored in separate files or locations and a master file for each item or group of items may contain pointers or filenames that may be used to retrieve the images and information.

What is claimed is:

1. A method for authenticating an item on which a signature is imprinted by an autographer, the method comprising:

using a camera to capture an image of the signature that is created by a writing instrument as the signature is being imprinted on an item;

transmitting an input signal from a computer external to the camera and the writing instrument;

receiving an input signal from the computer at the camera;

generating a triggering signal to initiate capture of the image by the camera after receiving the input signal from the computer;

transmitting the image from the camera;

storing the image on a computer readable medium; and electronically categorizing the image according to signing related information, wherein the camera is physically coupled to the writing instrument.

2. The method of claim 1, including providing a user access to first information related to the image.

3. The method of claim 2, wherein the access is provided to the user after the user activates a hotlink.

4. The method of claim 2, wherein the user is an owner of the item.

5. The method of claim 4, including providing a potential buyer access to second information related to the image.

6. The method of claim 5, wherein the owner is provided access to the first information related to the image after the owner activates an owner hotlink, and the potential buyer is provided access to the second information related to the image after the potential buyer activates a potential buyer hotlink.

7. The method of claim 6, wherein the owner hotlink and the potential buyer hotlink are related.

8. The method of claim 6, wherein the potential buyer hotlink is created by the owner.

9. The method of claim 2, wherein the user is a potential buyer of the item.

10. The method of claim 9, wherein the user may create an exhibition package including information related to the image.

11. The method of claim 10, wherein the signing-related information is stored in conjunction with the image.

12. The method of claim 11, wherein the signing-related information includes certificate of authenticity information.

13. The method of claim 12, wherein the signing-related information includes record of ownership information.

14. The method of claim 13, wherein the captured image includes an image of at least a portion of a signature, the signature being created by the autographer signing the item.

15. The method of claim 1, including transmitting a signal related to the image from the camera to a computer having the computer readable medium.

16. The method of claim 15, wherein the computer is communicatively connected to an owner computer through a communication network.

17. The method of claim 14, wherein the computer is communicatively connected to a potential buyer computer through a communication network.

18. The method of claim 15, including collecting autographer-identifying information.

19. The method of claim 16, wherein the autographer-identifying information includes an image of the autographer captured during the signing event.

20. The method of claim 17, wherein collecting autographer-identifying information includes capturing a second image, the second image having the autographer as its target.

21. The method of claim 18, wherein the autographer-identifying information includes a biometric sample submitted by the autographer.

22. The method of claim 19, wherein the autographer-identifying information includes an identification code.

23. The method of claim 20, wherein the autographer-identifying information includes a signature known to have been made by the autographer.

24. The method of claim 21, including sending a trigger signal to the camera to terminate capture of the image by the camera.

25. The method of claim 22, including uniquely identifying the item.

26. The method of claim 23, including affixing a unique item identifier to the item, said unique item identifier bearing a representation of identifying information and wherein said identifying includes translating the representation into information related to the unique identification code.

27. The method of claim 26, wherein the unique item identifier is a radio frequency identification tag.

28. The method of claim 24, wherein the unique item identifier is a bar code.

29. A system for authenticating an item on which a signature is imprinted by an autographer, the system comprising:
- a computer to transmit a signal to indicate the computer is ready to receive an image; and
- an apparatus, said apparatus including
  - a writing instrument to imprint a mark on the item;
  - a camera to capture an image of said mark, said camera carried by said writing instrument;
  - a transmitter to transmit the image of said mark;
  - a receiver to receive the signal from the first computer; and
  - a triggering signal generator to generate a triggering signal, in response to the receiver receiving the signal, to control the camera in the capturing of the image of said mark;
- the computer to receive the image of said mark, the computer further including a memory to store data related to an image of the mark imprinted on the item and a processor for electronically categorizing the data according to signing-related information.

30. The system of claim 26, wherein the computer is connected to a second computer through a communication network.

31. The system of claim 27, wherein the transmitter is a wireless transmitter.

32. The system of claim 28, wherein the transmitter is a wired transmitter.

33. A system for authenticating an item on which a signature is imprinted by an autographer, the system comprising:
- a computer to transmit a signal to indicate the computer is ready to receive an image;
- an apparatus for capturing an image, said apparatus including
  - a writing instrument to imprint a mark on the item, said writing instrument having a body with an aperture;
  - a camera to receive the signal from the first computer and to capture an image of said mark, said camera substantially disposed within said body and having a lens disposed so as to capture the image through said aperture; and
  - a transmitter to transmit the image of said mark, and
- an autographer-identifying information collector capable of capturing autographer-identifying information and electronically coupled to said camera, wherein said camera is prevented from capturing the image until the camera receives an authorization signal from said autographer-identifying information collector; and wherein
- the computer receives the image of said mark; said computer further including a memory to store data related to the image of the mark imprinted on the item and a processor for electronically categorizing the data according to signing-related information.

34. The system of claim 24, wherein the transmitter is a wireless transmitter.

35. The system of claim 34, wherein the transmitter is a wire transmitter.

36. The system of claim 34, wherein the first computer is connected to a second computer through a communication network.

37. The system of claim 35, including a biometric reader for collecting a biometric sample submitted by the autographer.

38. The system of claim 35, wherein the first computer receives an identification code submitted by the autographer and comparing it to a stored identification code associated with the autographer.

39. The system of claim 33, wherein the first computer compares the signature placed on the item by the autographer to a stored signature known to have been made by the autographer.

40. The system of claim 36, including a second camera for capturing an image of the autographer during the signing event.

41. The system of claim 33, wherein the item is a memorabilia item.

42. A system for authenticating a memorabilia item on which a signature is imprinted by an autographer during a signing event, the system comprising:
- a unique item identifier attached to a memorabilia item;
- a writing instrument, having a body with an aperture and capable of capturing the an image of the signature;
- a camera that captures the image to create a captured image, said camera substantially disposed within said body and having a lens disposed so as to capture the image through said aperture; and
- a reading device attached to said body to interpret the unique item identifier and control the camera in capturing the image when the unique item identifier is within a predetermined range;
- a transmitter to transmit the captured image to the first computer; and
- a computer to receive the captured image; said computer including a memory to store data related to the captured image and a processor for electronically categorizing the data according to signing-related information.

43. The system of claim 42, wherein the transmitter is a wireless transmitter.

44. The system of claim 42, wherein the transmitter is a wire transmitter.

45. The system of claim 37, wherein the computer is connected to a second computer through a communication network.

46. The system of claim 38, including a biometric reader for collecting a biometric sample submitted by the autographer.

47. The system of claim 39, wherein the computer receives an identification code submitted by the autographer and compares it to a stored identification code associated with the autographer.

48. The system of claim 40, wherein the computer compares the signature placed on the item by the autographer to a stored signature known to have been made by the autographer.

49. The system of claim 41, including a second camera for capturing an image of the autographer during the signing event.

* * * * *